(12) United States Patent
Chen et al.

(10) Patent No.: US 10,310,319 B2
(45) Date of Patent: Jun. 4, 2019

(54) DISPLAY DEVICE AND DISPLAY TERMINAL

(71) Applicant: Shenzhen China Star Optoelectronics Technology Co., Ltd., Shenzhen, Guangdong (CN)

(72) Inventors: Lixuan Chen, Guangdong (CN); Weiwei Zheng, Guangdong (CN); Yuchun Hsiao, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 281 days.

(21) Appl. No.: 15/032,625

(22) PCT Filed: Feb. 18, 2016

(86) PCT No.: PCT/CN2016/074064
§ 371 (c)(1),
(2) Date: Apr. 27, 2016

(87) PCT Pub. No.: WO2017/124593
PCT Pub. Date: Jul. 27, 2017

(65) Prior Publication Data
US 2018/0046018 A1    Feb. 15, 2018

(30) Foreign Application Priority Data
Jan. 22, 2016 (CN) .......................... 2016 1 0041730

(51) Int. Cl.
*G02F 1/1335* (2006.01)
*F21V 8/00* (2006.01)
(Continued)

(52) U.S. Cl.
CPC ...... *G02F 1/133514* (2013.01); *G02B 6/0011* (2013.01); *G02F 1/13725* (2013.01);
(Continued)

(58) Field of Classification Search
CPC ................................................. G02F 1/133514
See application file for complete search history.

(56) References Cited

U.S. PATENT DOCUMENTS

2004/0141104 A1* 7/2004 Yu .......................... G02B 6/003
349/65
2011/0157866 A1* 6/2011 Li ......................... H04M 1/0266
362/84

(Continued)

FOREIGN PATENT DOCUMENTS

CN    202110355 U    1/2012
CN    102608796 A    7/2012
(Continued)

*Primary Examiner* — Edmond C Lau
(74) *Attorney, Agent, or Firm* — Andrew C. Cheng

(57) ABSTRACT

The present invention provides a display device, wherein the display device comprises a display panel and a light source, and the display panel comprises an array substrate, a color filter substrate and a display medium packaged between the array substrate and the color filter substrate, and the display medium comprises liquid crystal molecules and dichroic dye molecules, and the array substrate comprises a glass substrate, and the glass substrate is located at one side of the array substrate away from the display medium, and the glass substrate comprises an incident surface, and the light source is oppositely located with the incident surface of the glass substrate. The present invention further provides a display terminal.

12 Claims, 2 Drawing Sheets

(51) Int. Cl.
*G02F 1/137* (2006.01)
*G02F 1/1333* (2006.01)

(52) U.S. Cl.
CPC .. *G02F 1/133528* (2013.01); *G02F 1/133615* (2013.01); *G02F 2001/133302* (2013.01)

(56) References Cited

U.S. PATENT DOCUMENTS

2013/0258230 A1* 10/2013 Yu .................... G02F 1/133308
349/58
2014/0211131 A1* 7/2014 Choi ................. G02F 1/133533
349/97
2016/0377922 A1* 12/2016 Oh .................... G02F 1/133707
349/96

FOREIGN PATENT DOCUMENTS

| CN | 103441139 A | 12/2013 |
| CN | 203422542 U | 2/2014 |
| CN | 103969882 A | 8/2014 |
| CN | 204044466 U | 12/2014 |
| JP | 11-72626 A | 3/1999 |

* cited by examiner

DISPLAY DEVICE AND DISPLAY TERMINAL

CROSS REFERENCE

This application claims the priority of Chinese Patent Application No. 201610041730.5, entitled "Display device and display terminal", filed on Jan. 22, 2016, the disclosure of which is incorporated herein by reference in its entirety.

FIELD OF THE INVENTION

The present invention relates to a display technology field, and more particularly to a display device and a display terminal.

BACKGROUND OF THE INVENTION

The liquid crystal display panel is the main stream flat panel display device technology in the present market. All display devices need backlight to be the light source. The traditional backlight module comprises a backlight source having LEDs and a light guide plate. In a general side light type backlight module structure, the light guide plate of PET or PMMA plastic material uniformly mixes the side light and illuminates the same upward. After passing through the optical films, such as the diffuser and the prism, the light enters the liquid crystal display panel. Meanwhile, polarizers are adhered at positions of the incident light and the illuminating light at the upper, lower surfaces of the glass substrate to make the incident light be linearly polarized light. The polarization direction is changed with the liquid crystal for realizing the control of the illuminating light brightness. However, with such structure that a plurality of layers of optical films and the backlight module structure components exist, it is very difficult to make the display device have the ultra thin structure in thickness.

SUMMARY OF THE INVENTION

An objective of the present invention is to provide a thinner display device.

The present invention further provides a display terminal.

The display device of the present invention comprises a display panel and a light source, and the display panel comprises an array substrate, a color filter substrate and a display medium packaged between the array substrate and the color filter substrate, and the display medium comprises liquid crystal molecules and dichroic dye molecules, and the array substrate comprises a glass substrate, and the glass substrate is located at one side of the array substrate away from the display medium, and the glass substrate comprises an incident surface, and the light source is oppositely located with the incident surface of the glass substrate.

An outer surface of the glass substrate away from the display medium is adhered with a reflective sheet.

Light guide screen dots are formed on the outer surface of the glass substrate.

The light source comprises an Aluminum substrate and a light emitting diode located on a surface of the Aluminum substrate.

The display panel comprises a polarizer, and the polarizer is adhered on a surface of the color filter substrate which is at an illuminating light direction thereof.

The light source is fixed with the array substrate with optical adhesive.

The display device further comprises a side frame, and the side frame is located at a periphery of the display panel, and the light source is accepted and fixed on the side frame, and faces toward the incident surface.

The present invention provides a display terminal, comprising a display device, and the display device comprises a display panel and a light source, and the display panel comprises an array substrate, a color filter substrate and a display medium packaged between the array substrate and the color filter substrate, and the display medium comprises liquid crystal molecules and dichroic dye molecules, and the array substrate comprises a glass substrate, and the glass substrate is located at one side of the array substrate away from the display medium, and the glass substrate comprises an incident surface, and the light source is oppositely located with the incident surface of the glass substrate.

An outer surface of the glass substrate away from the display medium is adhered with a reflective sheet.

Light guide screen dots are provided on the outer surface of the glass substrate.

The display device of the present invention directly uses the glass substrate of the display panel to be the light guide plate which is provided with the incident surface, and the light source is located at one side of the glass substrate, which is the incident surface to provide the lighting source for the display panel without additionally arranging the light guide plate and glue frame optical thin film. With the smaller thickness of the display device, the ultra thin display device design can be realized.

BRIEF DESCRIPTION OF THE DRAWINGS

In order to more clearly illustrate the embodiments of the present invention, the following figures will be described in the embodiments are briefly introduced. It is obvious that the drawings are only some embodiments of the present invention, those of ordinary skill in this field can obtain other figures according to these figures without paying the premise.

DETAILED DESCRIPTION OF PREFERRED EMBODIMENTS

For better explaining the technical solution and the effect of the present invention, the present invention will be further described in detail with the accompanying drawings in the specific embodiments.

Figure 1:
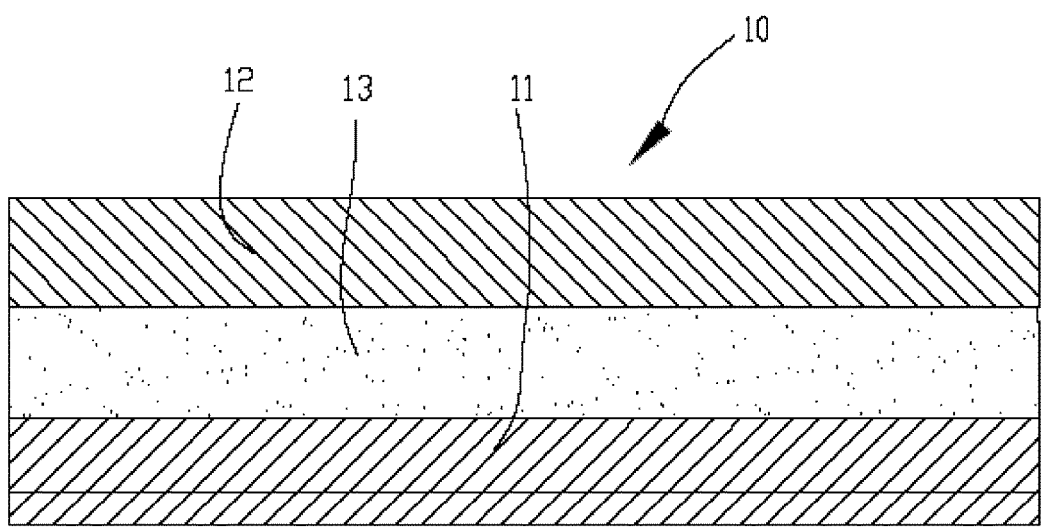
FIG. 1 is a sectional diagram of a display panel of a display device in the preferred embodiment of the present invention.
Figure 2:
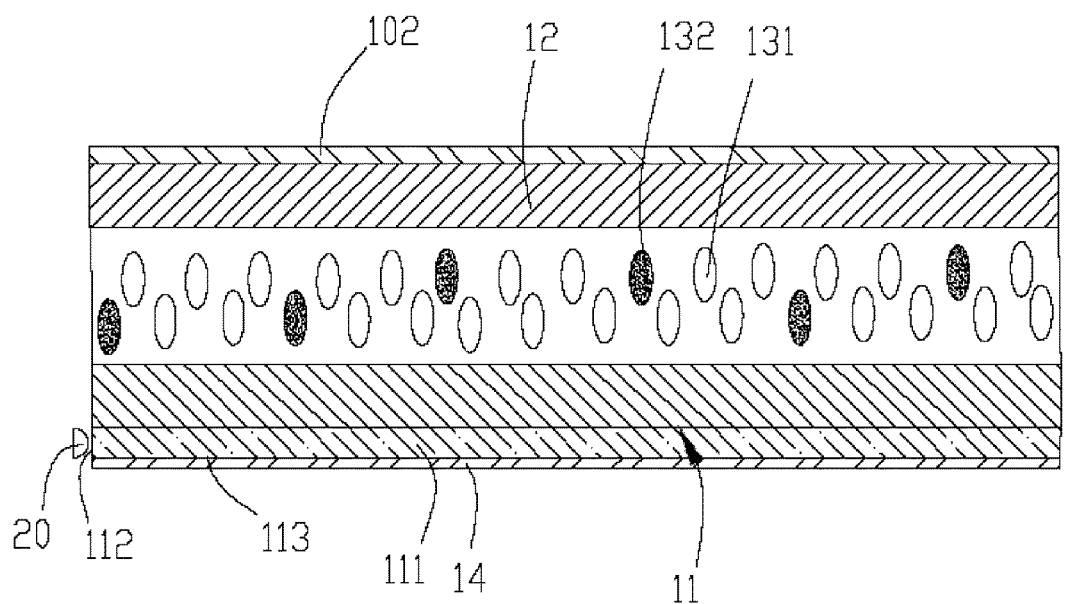
FIG. 2 is a sectional diagram of a display device in the preferred embodiment of the present invention.

The preferred embodiment of the present invention provides a display device and a display terminal. The display terminal can be a cellular phone, a tablet or a liquid crystal TV. Please refer to FIG. 1 and FIG. 2. The display device comprises a display panel 10 and a light source 20. The display panel 10 comprises an array substrate 11, a color filter substrate 12 and a display medium 13 packaged between the array substrate 11 and the color filter substrate 12, and the display medium comprises liquid crystal molecules 131 and dichroic dye molecules 132, and the array substrate 11 comprises a glass substrate 111. The glass substrate 111 is located at one side of the array substrate 11 away from the display medium, and the glass substrate 111 comprises an incident surface 112, and the light source 20 is oppositely located with the incident surface 112 of the glass substrate 111.

Because the liquid crystal molecules 131 possess anisotropies of dielectric and refractive indexes, the electrical field function can be employed to change the alignment of the liquid crystal molecules 131. The dichroic dye molecule 132 is a rod like structure. The dichroic dye molecules 132 having different absorption coefficients to the visible light along the long axis direction and the short axis direction are employed to be the object, which is solved in the subject, the liquid crystal molecules 131 which are orientated and aligned. The dichroic dye molecules 132, the object will change along with the subject, and thus to be aligned in the same direction with the liquid crystal molecules 131. In the electrical field, as the alignment of the liquid crystal molecules 131 which are employed to be the subject changes, the alignment of the dichroic dye molecules 132 which are employed to be the object changes along therewith. Namely, the absorption of the incident light by the dichroic dye molecules 132 will also change for solving the issue that the incident light of the glass substrate is non polarized light, and thus for realizing the normal display of the display panel. Under such circumstance, by locating a first transparent conductive plate and a second transparent conductive plate between the array substrate 11 and the color filter substrate 12, the display medium is positioned between the first transparent conductive plate and the second transparent conductive plate. With the voltages between the first transparent conductive plate and the second transparent conductive plate, the twist angles of the liquid crystal molecules 131 between the two transparent conductive plates are controlled, and thus the dichroic dye molecules 132 are twisted with a corresponding angle along with the liquid crystal molecules 131.

In this embodiment, the display panel 10 is a liquid crystal display panel, comprising a display surface 101, and a polarizer is provided on the display surface 101. That is to say, the polarizer 102 is adhered on a surface of the color filter substrate 12 which is at an illuminating light direction thereof. The glass substrate 111 comprises an outer surface 113 connected with the incident surface 112 and an illuminating surface (not shown). The outer surface 113 is located away from the display surface 101.

In this embodiment, the outer surface 113 of the glass substrate 111 away from the display medium 13 is adhered with a reflective sheet 14. The reflective sheet 14 is employed to reflect the light of the glass substrate 111 to the illuminating light direction to enhance the utilization of the glass substrate 111 and to prevent the light leakage at the bottom of the glass substrate 111.

In this embodiment, light guide screen dots are formed on the outer surface of the glass substrate 111. As the light irradiates on the respective light guide dots of the light guide screen dots, the reflected light diffuses toward various angles, and then breaks the reflection condition and illuminates from the front illuminating surface of the glass substrate, and thus to promote the light guiding efficiency of the glass substrate 111. The other circumferential surfaces of the glass substrate 111 except the incident surface are adhered with light shielding layers, which can effectively prevent the light of the glass substrate leaking from the circumferential sides.

In this embodiment, the light source 13 comprises an Aluminum substrate and a light emitting diode located on a surface of the Aluminum substrate. The light source 13 is fixed with the array substrate with optical adhesive. Specifically, the light emitting diodes of the light source 13 faces toward the incident surface 112, and the Aluminum substrate is fixed with the edges of the array substrate 11 with optical adhesive.

It is understood that in other embodiments, the display device further comprises a side frame (not shown), and the side frame is located at a periphery of the display panel and fixed with the display panel, and the light source 13 is accepted and fixed on the side frame, and faces toward the incident surface 112. The side frame is a rectangular frame body and is located around the periphery of the display panel.

The display device of the present invention directly uses the glass substrate of the display panel to be the light guide plate which is provided with the incident surface, and the light source is located at one side of the glass substrate, which is the incident surface to provide the lighting source for the display panel, and meanwhile, the liquid crystal molecules are mixed with the dichroic dye molecules to construct the guest-host effect phenomenon for solving the issue that the incident light is non polarized light for satisfying the normal display function of the display panel without additionally arranging the light guide plate and glue frame optical thin film. With the smaller thickness of the display device, the ultra thin display device design can be realized, and material can be saved.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A display device, wherein the display device comprises a display panel and a light source, and the display panel comprises an array substrate, a color filter substrate and a display medium packaged between the array substrate and the color filter substrate, and the display medium comprises liquid crystal molecules and dichroic dye molecules, and the array substrate comprises a glass substrate, and the glass substrate is located at one side of the array substrate away from the display medium, and the glass substrate comprises an incident surface to be a light guide plate, and the light source is directly and oppositely located with the incident surface of the glass substrate, wherein the liquid crystal molecules are mixed with the dichroic dye molecules to construct a guest-host effect phenomenon for normal display without providing an additional light guide plate and a glue frame optical thin film.

2. The display device according to claim 1, wherein an outer surface of the glass substrate away from the display medium is adhered with a reflective sheet.

3. The display device according to claim 2, wherein light guide screen dots are formed on the outer surface of the glass substrate.

4. The display device according to claim 1, wherein the light source comprises an Aluminum substrate and a light emitting diode located on a surface of the Aluminum substrate.

5. The display device according to claim 1, wherein the display panel comprises a polarizer, and the polarizer is adhered on a surface of the color filter substrate which is at an illuminating light direction thereof.

6. The display device according to claim 1, wherein the light source is fixed with the array substrate with optical adhesive.

7. A display terminal, wherein the display terminal comprises a display device, and the display device comprises a display panel and a light source, and the display panel comprises an array substrate, a color filter substrate and a display medium packaged between the array substrate and the color filter substrate, and the display medium comprises liquid crystal molecules and dichroic dye molecules, and the array substrate comprises a glass substrate, and the glass substrate is located at one side of the array substrate away from the display medium, and the glass substrate comprises an incident surface to be a light guide plate, and the light source is directly and oppositely located with the incident surface of the glass substrate, wherein the liquid crystal molecules are mixed with the dichroic dye molecules to construct a guest-host effect phenomenon for normal display without providing an additional light guide plate and a glue frame optical thin film.

8. The display terminal according to claim 7, wherein an outer surface of the glass substrate away from the display medium is adhered with a reflective sheet.

9. The display terminal according to claim 8, wherein light guide screen dots are formed on the outer surface of the glass substrate.

10. The display terminal according to claim 7, wherein the light source comprises an Aluminum substrate and a light emitting diode located on a surface of the Aluminum substrate.

11. The display terminal according to claim 7, wherein the display panel comprises a polarizer, and the polarizer is adhered on a surface of the color filter substrate which is at an illuminating light direction thereof.

12. The display terminal according to claim 7, wherein the light source is fixed with the array substrate with optical adhesive.

* * * * *